(12) United States Patent
El Moumouhi et al.

(10) Patent No.: US 9,763,076 B2
(45) Date of Patent: Sep. 12, 2017

(54) MANAGEMENT OF MOBILITY IN A COMMUNICATION NETWORK AS A FUNCTION OF A CREDITS USAGE PROFILE

(71) Applicant: Orange, Paris (FR)

(72) Inventors: Sanaa El Moumouhi, Montrouge (FR); Benoît Radier, Perros Guirec (FR)

(73) Assignee: Orange, Paris (FR)

(*) Notice: Subject to any disclaimer, the term of this patent is extended or adjusted under 35 U.S.C. 154(b) by 0 days.

(21) Appl. No.: 14/415,720

(22) PCT Filed: Jun. 21, 2013

(86) PCT No.: PCT/FR2013/051461
§ 371 (c)(1),
(2) Date: Jan. 19, 2015

(87) PCT Pub. No.: WO2014/013156
PCT Pub. Date: Jan. 23, 2014

(65) Prior Publication Data
US 2015/0181407 A1 Jun. 25, 2015

(30) Foreign Application Priority Data
Jul. 20, 2012 (FR) ...................................... 12 57055

(51) Int. Cl.
*H04W 4/24* (2009.01)
*H04W 4/26* (2009.01)
*H04W 48/18* (2009.01)
*H04W 48/20* (2009.01)
*H04W 8/02* (2009.01)
*H04W 8/20* (2009.01)

(52) U.S. Cl.
CPC ............... *H04W 8/02* (2013.01); *H04W 4/24* (2013.01); *H04W 48/18* (2013.01); *H04W 8/20* (2013.01)

(58) Field of Classification Search
CPC ......... H04W 4/24; H04W 28/24; H04W 4/06; H04W 4/26; H04W 12/08; H04W 48/20
(Continued)

(56) References Cited

U.S. PATENT DOCUMENTS 7,043,277 B1 * 5/2006 Pfister ...................... H04L 41/12
455/446
7,263,076 B1 * 8/2007 Leibovitz ................ H04L 63/10
370/310
(Continued)

FOREIGN PATENT DOCUMENTS

EP          2 571 311 A1    3/2013
WO     WO 2011/050835 A1   5/2011
(Continued)

OTHER PUBLICATIONS

Office Action mailed Jul. 15, 2016 for U.S. Appl. No. 14/415,718, filed Jan. 19, 2015.
(Continued)

*Primary Examiner* — Allahyar Kasraian
(74) *Attorney, Agent, or Firm* — Knobbe Martens Olson & Bear LLP

(57) ABSTRACT

A method of managing mobility of a mobile terminal in a communication network comprising a plurality of access points and an access points discovery server adapted for providing the mobile terminal with a list of network access points to which the mobile terminal can connect is disclosed. In some embodiments, the method comprises the following processes implemented by the access points discovery server: recovery, from a credits management server, of a credits usage profile associated with the mobile terminal and generation of the list of access points as a function of said credits usage profile.

12 Claims, 2 Drawing Sheets

Figure 1:
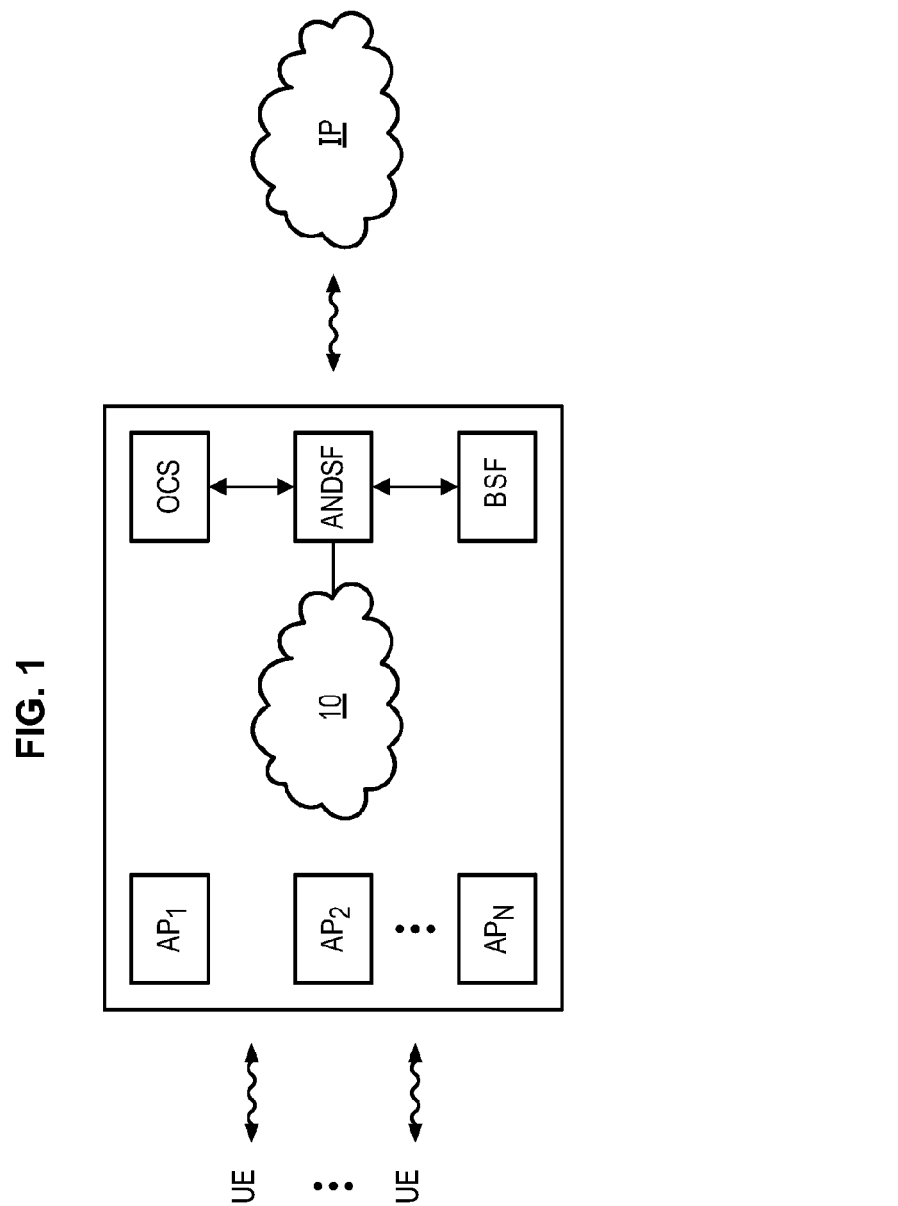

(58) Field of Classification Search
USPC .......................... 455/405–409, 432.1–435.3
See application file for complete search history.

(56) References Cited

U.S. PATENT DOCUMENTS

| | | | | |
|---|---|---|---|---|
| 7,483,995 | B2* | 1/2009 | Abhishek | H04W 36/0055 370/338 |
| 8,160,611 | B1 | 4/2012 | Oroskar | |
| 9,215,335 | B1* | 12/2015 | Nas | H04M 15/66 |
| 2002/0075844 | A1* | 6/2002 | Hagen | H04L 63/0442 370/351 |
| 2002/0183038 | A1* | 12/2002 | Comstock | H04L 12/14 455/406 |
| 2003/0134615 | A1* | 7/2003 | Takeuchi | G06Q 20/02 455/411 |
| 2003/0140256 | A1* | 7/2003 | Hauenstein | H04L 12/14 726/10 |
| 2004/0156372 | A1 | 8/2004 | Hussa | |
| 2005/0003827 | A1 | 1/2005 | Whelan | |
| 2005/0003829 | A1 | 1/2005 | Lala et al. | |
| 2005/0270998 | A1* | 12/2005 | Rambo | H04W 84/12 370/315 |
| 2007/0033139 | A1* | 2/2007 | Handler | G06Q 20/10 705/44 |
| 2007/0072584 | A1* | 3/2007 | Jain | H04M 15/745 455/405 |
| 2008/0032738 | A1* | 2/2008 | Boyer | H04W 88/06 455/556.1 |
| 2009/0007246 | A1* | 1/2009 | Gutowski | H04L 63/20 726/6 |
| 2009/0047948 | A1 | 2/2009 | Turetsky et al. | |
| 2009/0048915 | A1* | 2/2009 | Chan | G06Q 30/02 705/14.64 |
| 2009/0221287 | A1* | 9/2009 | Balasubramanian | H04W 48/16 455/434 |
| 2009/0239576 | A1* | 9/2009 | Liao | H04M 1/72522 455/552.1 |
| 2009/0245176 | A1 | 10/2009 | Balasubramanian et al. | |
| 2012/0064856 | A1* | 3/2012 | Nandal | H04L 12/1467 455/406 |
| 2012/0117236 | A1* | 5/2012 | Fukuda | G06Q 30/04 709/225 |
| 2012/0122515 | A1 | 5/2012 | Han et al. | |
| 2013/0078995 | A1* | 3/2013 | Jouin | G06F 3/1438 455/426.1 |
| 2013/0143542 | A1 | 6/2013 | Kovvali et al. | |
| 2013/0155849 | A1 | 6/2013 | Koodli et al. | |
| 2013/0208696 | A1 | 8/2013 | Martin et al. | |
| 2013/0272285 | A1 | 10/2013 | Goldsmith et al. | |
| 2014/0080539 | A1 | 3/2014 | Scherzer et al. | |
| 2014/0204903 | A1 | 7/2014 | Kim et al. | |
| 2014/0206349 | A1 | 7/2014 | Bertrand et al. | |
| 2014/0315536 | A1 | 10/2014 | Chow et al. | |
| 2015/0208227 | A1 | 7/2015 | Moumouhi et al. | |
| 2015/0215850 | A1 | 7/2015 | Moumouhi et al. | |
| 2015/0296363 | A1* | 10/2015 | Kaikkonen | H04W 4/24 455/406 |

FOREIGN PATENT DOCUMENTS

| | | |
|---|---|---|
| WO | WO 2011/147465 A1 | 12/2011 |
| WO | WO 2012/149954 A1 | 11/2012 |
| WO | WO 2014/013155 A1 | 1/2014 |
| WO | WO 2014/013196 A1 | 1/2014 |

OTHER PUBLICATIONS

Amendment and Response filed Jan. 21, 2016 in U.S. Appl. No. 14/415,716, filed Jan. 19, 2015.
U.S. Office Action dated May 19, 2016 in co-pending U.S. Appl. No. 14/415,716.
Request for Continued Examination and Submission with RCE dated Sep. 19, 2016 for U.S. Appl. No. 14/415,716, filed Jan. 19, 2015, 12 pages.
Office Action mailed Oct. 23, 2015 for U.S. Publication No. 2015/0215850 filed Jan. 19, 2015.
Klimasauskas, Juras; Designing the algorithm for network discovery and selection in heterogeneous radio network environment, Student Master Thesis; Project Library in Aalborg University; Dec. 1, 2011; 78 pages.
Amendment and Response dated Nov. 9, 2016 for U.S. Appl. No. 14/415,718, filed Jan. 19, 2015.
Office Action mailed Jan. 6, 2017 for U.S. Appl. No. 14/415,718, filed Jan. 19, 2015.
Notice of Allowance dated Nov. 1, 2016 in U.S. Appl. No. 14/415,716, filed Jan. 19, 2015.
RCE/IDS after Allowance dated Jan. 31, 2017 in U.S. Appl. No. 14/415,716, filed Jan. 19, 2015.
3GPP TS 33.228 v9.1.0 (Jun. 2010) 3rd Generation Partnership Project; Technical Specification Group Services and System Aspects; Generic Authentication Architecture (GAA); Access to network application functions using Hypertext Transfer Protocol over Transport Layer Security (HTTPS) (Release 9), 22 pp., Jun. 2010.
3GPP TS 23.402 v11.3.0 (Jun. 2012), 3rd Generation Partnership Project; Technical Specification Group Services and Systems Aspects; Architecture enhancements for non-3GPP accesses (Release 11), Jun. 2012, 252 pp.
3GPP TS 32.299 v11.4.0 (Jun. 2012) 3rd Generation Partnership Project; Technical Specification Group Services and System Aspects; Telecommunication management; Charging management; Diameter charging applications (Release 11), 151 pp. Jun. 2012.
3GPP TS 23.060 v11.2.0 (Jun. 2012), 3rd Generation Partnership Project; Technical Specification Group Services and System Aspects; General Packet Radio Service (GPRS); Services description; Stage 2 (Release 11), 335 pp. Jun. 2012.
3GPP TS 24.302 V.11.3.0 (Jun. 2012) 3rd Generation Partnership Project; Technical Specification Group Core Network and Terminals; Access to the 3GPP Evolved Packet Core (EPC) via non-3GPP access networks: Stage 3 (Release 11), 60 pp. Jun. 2012.
3GPP TS 24.312 V11.3.0 (Jun. 2012) 3rd Generation Partnership Project; Technical Specification Group Core Network and Terminals; Access Network Discovery and Selection Function (ANDSF) Management Object (MO) (Release 11), 162 pp. Jun. 2012.
Corici, et al. Enhanced access network discovery and selection in 3GPP evolved packet core. *3rd IEEE LCN Workshop on User Mobility and Vehicular Networks (ON-MOVE 2009)*, Zurich, Switzerland, Oct. 20-23, 2009, pp. 677-682.
Ericsson, et al. Aug. 24, 2010. QoS for a 3GPP UE in BBF. 3GPP Draft; S2-103647_QOS_3GPP_UE_BBF, 3rd Generation Partnership Project (3GPP), Mobile Competence Centre; 650, Route des Lucioles, F-06921 Sophia-Antipolis Cedex, France, vol. SA WG2, no. Brunstad; Sep. 3, 2010, 19 pp.
Tervonen, J. Dec. 22, 2010. Deliverable DA2.2.23 Policy and Charging Control Functionality with WLAN and PBRM. Retrieved from the Internet on May 2, 2013: URL:http://www.futureinternet.fi/publications/ICT_SHOK_FI_Phase2_DA2.2.23_10.pdf. 25 pages.
Tervonen, J. Jun. 30, 2010. Deliverable DA2.2.22 Offloading Traffic from Cellular Networks with PBRM. Retrieved from the Internet on Oct. 19, 2011: URL:http://www.futureinternet.fi/publications/ICT_SHOK_FI_Phase2_DA2.2.22_10-1.pdf. 39 pages.
Preliminary Search Report dated Apr. 12, 2013 in French patent application No. 1257065, 2 pp.
International Search Report mailed Sep. 24, 2013 for International Application No. PCT/FR2013/051460 filed Jun. 21, 2013, 7 pp.
Preliminary Search Report dated Apr. 12, 2013 in French patent application No. 1257055, 2 pp.
International Search Report mailed Sep. 24, 2013 for International Application No. PCT/FR2013/051461 filed Jun. 21, 2013, 7 pp.
Preliminary Search Report dated May 15, 2013 in French patent application No. 1257050, 4 pp.
International Search Report mailed Sep. 24, 2013 for International Application No. PCT/FR2013/051719 filed Jul. 17, 2013, 7 pp.
U.S. Appl. No. 14/415,718, filed Jan. 19, 2015, 27 pp.

(56) References Cited

OTHER PUBLICATIONS

Preliminary Amendment dated Jan. 19, 2015 in U.S. Appl. No. 14/415,718, 9 pp.
U.S. Appl. No. 14/415,716, filed Jan. 19, 2015, 20 pp.
Preliminary Amendment dated Jan. 19, 2015 in U.S. Appl. No. 14/415,716, 8 pp.

* cited by examiner

MANAGEMENT OF MOBILITY IN A COMMUNICATION NETWORK AS A FUNCTION OF A CREDITS USAGE PROFILE

RELATED APPLICATIONS

This application is the U.S. National Phase of Application No. PCT/FR2013/051461 entitled "MANAGEMENT OF MOBILITY IN A COMMUNICATION NETWORK AS A FUNCTION OF A CREDITS USAGE PROFILE" filed Jun. 21, 2013, which designated the United States, and which claims the benefit of French Application No. 1257055 filed Jul. 20, 2012.

GENERAL TECHNICAL FIELD

The invention relates to the field of cellular communications, and more particularly the management of mobility or movement between 3GPP and non-3GPP access networks such as specified by the standard 3GPP, in particular in the technical specifications TS 24.302 and TS 24.312.

STATE OF THE ART

When a user of a mobile communications terminal is subscribed to a telecommunications operator, this telecommunications operator allows the user to connect to a communications network by means of his mobile terminal, enabling taking out a subscription to then access several types of services originating from one IP (Internet Protocol) network, such as the Internet network.

When this network is a 3GPP cellular network (for example, Edge, 3G, 3G+, 4G, LTE) it comprises a network core, as well as a 3GPP access network comprising a set of 3GPP access points (NodeB for 3G) by which the terminal connects.

In addition to the 3GPP access network, the operator can provide its subscribers with non-3GPP access points (designated by the term "hot spot") to increase coverage and capacity of the 3GPP access network.

The communications terminal can provide mobility from a 3GPP access network to a non-3GPP network, and vice versa.

In the 3GPP standard, especially in specifications TS 24.302 and TS 24.312, an access point discovery server (Access Network Discovery and Selection Function, (ANDSF)) is provided. In particular, on request from a moving mobile terminal, this ANDSF server supplies a list of access points near the position of the mobile terminal. The access points relate to non-3GPP access networks (for example Wi-Fi, Wimax) and/or 3GPP access networks (for example Edge, 3G, 3G+, 4G, LTE).

In addition, this ANDSF server comprises a database comprising information on the topology of access networks and information on rules for selecting an access network, especially rules of a telecommunications operator, enabling ordering the list of types of access and access points which the terminal can preferably use.

To receive the list, the terminal sends a request to the ANDSF server so that in case of a change in position of the mobile terminal or in case of degradation of the quality of the radio link, the terminal can retrieve the list of available access points near the mobile terminal.

The mobile terminal stores in memory a list of access points to which it can connect, prepared by the ANDSF server, then moves to an access network of the list, if necessary by making use of this list of access points.

This list of access points is in the form of an ordered list of access points near the mobile terminal, optionally classified by types of access network (3G, 4G, Wifi, Wimax).

Management of mobility currently deployed by the ANDSF server is based only on connectivity criteria, optionally involving rules so that access to a service passes via a certain type of access to let the terminal obtain the service with better service quality (Quality Of Service, (QoS)).

But in managing mobility there is a need to consider a profile of the user of the mobile terminal relative to his needs in terms of services subscribed to from a telecommunications operator, and especially credits which the user has to utilise different access networks.

PRESENTATION OF THE INVENTION

The invention responds to this need and according to a first aspect proposes a method for management of mobility of a mobile terminal in a communications network comprising a plurality of access points and an access point discovery server adapted to supply the mobile terminal with a list of access points of the network to which the mobile terminal can connect, the method comprising the following steps conducted by the access point discovery server:

retrieval, from a credits management server, of a credits usage profile linked to the mobile terminal;

generation of the list of access points as a function of said credits usage profile.

The method of the invention is advantageously completed by the following characteristics, taken alone or in any of their technically possible combinations:

retrieval of the credits usage profile comprises sending a request from the credits management server and the receipt of at least one message comprising the credits usage profile, sent by the credits management server following receipt of said request;

the request is a request subscribing to updating of credits and the message comprising the credits usage profile is sent by the credits management server following modification of the credits usage profile linked to the mobile terminal;

modification of the credits usage profile comprises depletion of at least one credit allocated to the user of the mobile terminal in the credits usage profile or the recharging of at least one depleted credit allocated to the user of the mobile terminal in the credits usage profile;

the method further comprises sending the list of access points to the mobile terminal, said mobile terminal selecting a fresh access point where it can attach in the event of roaming mobility by way of said list;

the mobile terminal is attached initially to a 3GPP access network and where the list comprises access points belonging to a non-3GPP network.

According to a second aspect, the invention relates to an access point discovery server capable of transmitting to a mobile terminal a list of access points to which the mobile terminal can connect, among a plurality of access points of a communications network, the access point discovery server being configured to: retrieve, from a credits management server, a credits usage profile linked to the mobile terminal; and generate the list of access points as a function of said credits usage profile.

According to a third aspect, the invention relates to a credits management server comprising a database in which is stored the credits usage profile of the user of a mobile terminal, the credits management server being configured to transmit to an access point discovery server said credits usage profile following receipt of a request sent by said access point discovery server. Advantageously, the request sent by the access point discovery server is a request subscribing to updating of credits, the server being configured to transmit the credits usage profile to the access point discovery server following updating of the credits usage profile.

According to a fourth aspect, the invention relates to a mobile terminal comprising a selection module of an access point of a communications network, this selection module being configured to select the access point in a list of access points received from an access point discovery server of the communications network, this list of access points being generated as a function of a credits usage profile retrieved by the access point discovery server from a credits management server.

According to a fifth aspect, the invention relates to a management system for movement of a mobile terminal comprising a credits management server according to the third aspect of the invention and an access point discovery server according to the second aspect of the invention.

According to a sixth aspect, the invention relates to a computer program product comprising code instructions for execution of a method according to the first aspect of the invention, when the latter is executed by a processor.

Based on the credits usage profile relative to subscribed services the mobility of a mobile communications terminal is optimised to maximise user experience quality.

PRESENTATION OF FIGURES

Figure 2:
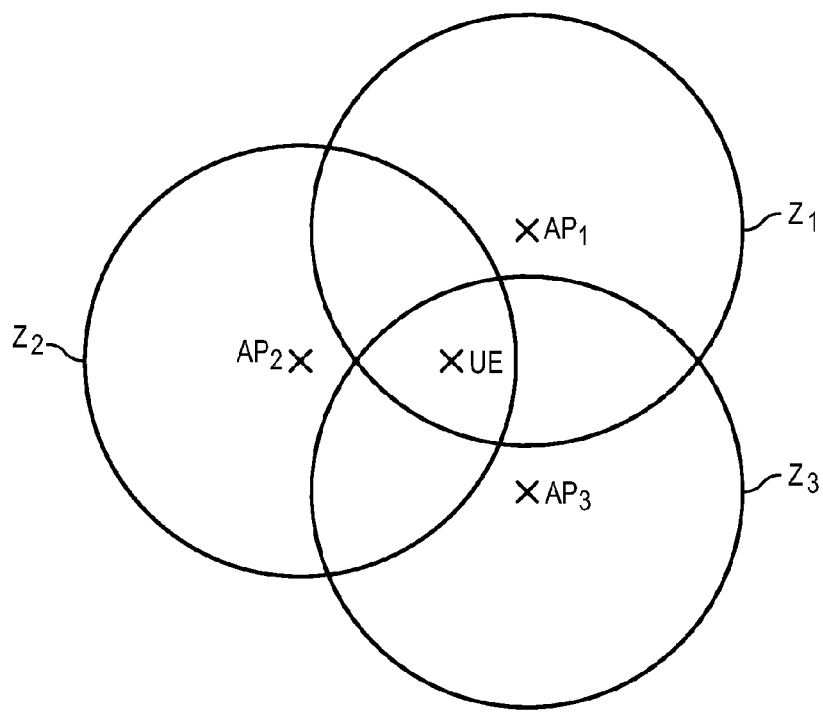
Figure 3:
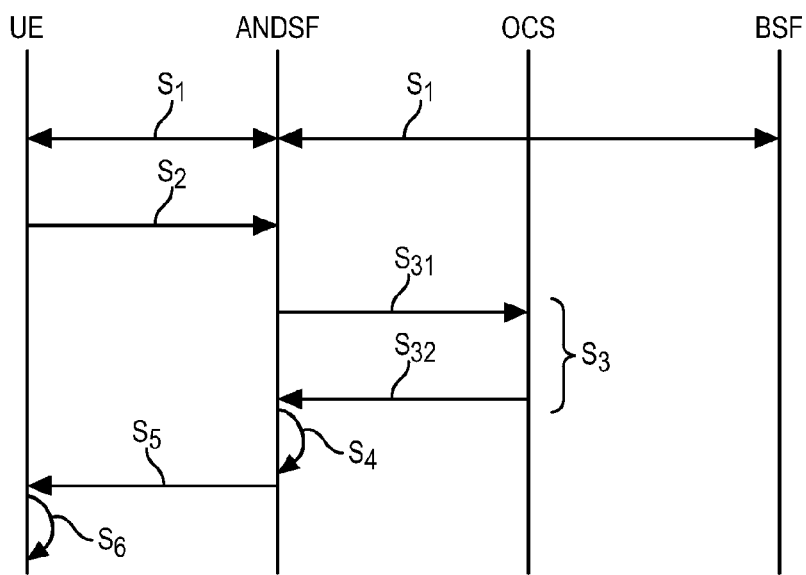

Other characteristics, aims and advantages of the invention will emerge from the following description which is purely illustrative and non-limiting, and which must be considered in conjunction with the appended drawings, in which:

FIG. 1 schematically illustrates a communications network of an operator;

FIG. 2 schematically illustrates deployment of access points of a communications network of an operator; and FIG. 3 illustrates a management method for movement of a mobile terminal, in a communications network, according to an embodiment of the invention.

DETAILED DESCRIPTION OF THE INVENTION

In relation to FIG. 1, a communications network according to the invention is illustrated.

The network comprises several APi access points enabling access to access networks 10 and at least one mobile terminal UE. An access network lets the mobile terminal UE connect to an IP (Internet Protocol) network of Internet type to access services.

An access point APi (i=1, 2, 3) defines a coverage area Zi (i=1, 2, 3) in which the mobile terminal UE is located relative to an access point. These access points are either 3GPP access points, or non-3GPP access points. In the case of a 4G access network, the access points are equipment called "eNodeB". In the case of a 3G access network, the access points are "NodeB". In the case of a 2G or GPRS access network, the access points are BTS (Base Transceiver Station). In the case of a WiFi access network, the access points are "hotspots". Finally, in the case of WIMAX an access network, the access points are base stations.

The network comprises an access point discovery server, designated by ANDSF, which manages a list of access points, a credits management server (Online Charging System) and a mutual authentication server (Bootstrap Serving Function, (BSF)).

The ANDSF access point discovery server can be implemented in the form of a server dedicated to this sole functionality of discovery of access points or in the form of a software module installed in a server having other functions in the network, especially a PCRF server in charge of applying certain network policies and invoicing rules.

The ANDSF, OCS and BSF terminologies are reprised from 3GPP standards and are used hereinbelow, without the invention being limited to the sole entities mentioned in these standards, the invention applying to any network having physical entities having the same functionalities as these entities.

A user of a mobile terminal UE previously takes out a subscription to one or more services from a telecommunications operator.

In this way, each user has a use profile, with credits associated with the services to which he has subscribed ("Online charging"), stored in a real-time credit account database saved in the credits management OCS server. This credits usage profile is used to identify whether the user has an available account, whether he can use the network from which he has taken out a subscription and which type of service on the network he can use as a function of his credits already used and remaining credits.

The credits usage profile is updated in the credits management OCS server each time the service is used, for example periodically, on completion of a service session, or when the credits are depleted.

Reference is now made to FIG. 2 which illustrates a mobile terminal UE located in the coverage area Z1, Z2, Z3 of three access points AP1, AP2, AP3 of a communications network.

It is considered that the mobile terminal UE is connected to the access point API and that it is accessing a certain type of service.

It is specified here that "connected to an access point" means that the mobile terminal UE has an open session with the access point to receive a service.

It is also specified that "covered by an access point" means that the mobile terminal UE is located in a coverage area of an access point APi.

If the mobile terminal UE is mobile in the network, it can move from the access point AP1 to another access point AP2, AP3 which can be selected by means of the management method for movement described hereinbelow.

In relation to FIG. 3, this described a management method for mobility of a mobile terminal UE according to an embodiment of the present invention.

Prior to moving between access points, the mobile terminal UE detects (a step not detailed) the necessity of initiating the mobility procedure based on a triggering event, for example an event such as degradation of the transmission channel of the service.

When it is decided to initiate mobility, the terminal can first initiate with the ANDSF server to set up a communications session with the latter.

For this to happen, in a step S1, the terminal UE is authenticated with the ANDSF server, for example by using the procedure described in technical specification TS 33.402 ("UE-ANDSF communication security" procedure) which allows the ANDSF server to retrieve security information between the terminal UE and the ANDSF server from the BSF priming function server, as well as the rules for defining access which could be used by the terminal UE as a function of its subscription profile and its preferences.

Following S1 authentication, the terminal UE sends (step S2) to the ANDSF server a request for retrieval of a list of access points, via which it can connect to access a service. This request contains typically an identifier of the mobile terminal UE.

The ANDSF server then retrieves (step S3) from the credits management OCS server the credits usage profile of the user of the mobile terminal UE, this profile being linked to the mobile terminal UE.

This retrieval is done by sending (step S31), as a function of information retrieved during authentication, a request to the OCS server to verify the credits usage profile of the user of the mobile terminal UE, this request comprising an identifier of the mobile terminal UE or of its user. This request may especially be a "Diameter/Radius" query of the type "Debit Unit Request" such as indicated in technical specification TS 32.299.

Following receipt of this request, the OCS server retrieves the use profile linked to the mobile terminal UE, or to its user, by the identifier transmitted in the request and in response sends (step S32) the ANDSF server a message containing the credits usage profile of the user and especially information relative to consumption of the service. This message can be in the form of a response with the protocol "Diameter" or "Radius" of the type "Debit Unit Response" such as described in technical specification TS 32.299.

In a first embodiment, the credits usage profile can be retrieved on request from the ANDSF server, and this can be repeated over time.

In another advantageous embodiment the request sent to the OCS server is a request for subscription to updating credits, indicating that the OCS server should send the credits usage profile at each updating of this credits usage profile (for example by sending a request of type "CC-Request-type (=EVEN-Req)" to which the OCS server responds by a message of "CC-Requested-action subscriber ID=CHECK-BAL") type.

In this latter case, with each significant modification of e this credits usage profile (for example when a credit of the user is depleted relative to a certain type of access network or by comparison when a credit is recharged for a certain type of access network), the credits management OCS server sends the ANDSF access point discovery server a message for updating of credits containing the credits usage profile so that this ANDSF server is informed permanently of the state of credits of the user.

This message can take the form "CAA (Result–Balance= ENOUGH-CREDIT, NO CREDIT)".

In particular, it is possible to send such a message for updating of credits only when one of the credits of the user is depleted or, on the contrary, when a depleted credit is recharged so as to inform the ANDSF server only of those modifications of credits which impact the possibility (or not) of using an access network.

In another embodiment, this message for updating of credits can be sent only when one of the credits of the user drops below a threshold for which it is preferable to change access network.

As a function of this information, as well as optionally of the access networks which the ANDSF server has identified as a function of the location of the user, the ANDSF server sets up (step S4) a list of access points as a function of the credits usage profile it has received from the OCS server.

This list is advantageously an ordered list, set up from a set of possible access points of the communications network by arranging these access points (optionally combined by type of access point) as a function of this credits usage profile. In this case, the access points first appearing in this ordered list are prioritised relative to the following ones, the mobile terminal first trying to attach to the first access point of the list, then to the second access point in case of failure to attach to the first access point, and so on. Alternatively, the list generated by the ANDSF server can contain only some of the access points selected as a function of this credits usage profile.

So, by way of example, when the consumption credit 3G data of the user is expired, the ANDSF server can decide to generate an ordered list of access points in which the access points WiFi are prioritised relative to the "NodeB" access points so that the user may continue to utilise his service by way of a non-3GPP access network on which he still has credits. As a result, when the user recharges his consumption credit of 3G data the ANDSF server can modify the ordered list to change the priority granted to the 3G access points, available again.

Alternatively, every time when the consumption credit of 3G data of the user has expired, the ANDSF server can decide to generate a list of access points containing no more 3G "NodeB" stations, but only non-3GPP "WiFi" access points to oblige the user to use a non-3GPP access network on which he still has credits to continue accessing this service. As a result, when the user recharges his consumption credit of 3G data, the ANDSF server can modify the list to reintroduce the 3G access points, available again.

Once set up by the ANDSF server, this list is then sent (step S5) to the mobile terminal UE which can make a decision on mobility from information received from the ANDSF and initiate (step S6), if necessary, moving by selecting a fresh access point within this list. This mobility is then managed by the terminal following the 3GPP or non-3GPP recommendations.

For example, if following transmission of the request from the terminal UE to the ANDSF server, the terminal is accessing a service on a 3GPP network and if according to its credits usage profile coming from the OCS server, its use credit of this service on the 3GPP access network is low, whereas this is not the case on a non-3GPP access network, the ANDSF server can prioritise the non-3GPP access network rather than the 3GPP network, by sending back a list of access points in which the non-3GPP access points are prioritised relative to the 3GPP access points, or even a list containing non-3GPP only access points as indicated earlier.

As a consequence, the ANDSF server sends the terminal UE the list of access points prioritised as a function of the credits usage profile, which allows the terminal UE to initiate movement between the two access networks by taking into account credits of the user. In this way, as a function of the credits usage profile the terminal UE toggles from the 3GPP access network to the non-3GPP access network (or inversely according to the case), which lets it economise its credit consumption on the 3GPP access network, or else continue its service which it would have not been able to continue on the 3GPP network for lack of credit.

The invention is not limited to the method described above but relates also to a system for management of movement of a mobile terminal comprising a credits management OCS server comprising a database in which is stored the credits usage profile of the user of a mobile terminal UE and ANDSF access point discovery server capable of transmitting to a mobile terminal UE a list of access points to which the mobile terminal can connect, from a set of access points of a communications network.

The credits management server is configured to transmit (step S32) to an ANDSF access point discovery server said credits usage profile following receipt (step S31) of a request sent by said ANDSF access point discovery server.

The ANDSF access point discovery server is configured to retrieve (step S3), from a credits management OCS server, a credits usage profile linked to the mobile terminal UE and to generate (step S4) the list of access points selected as a function of said credits usage profile.

For its part, the mobile terminal UE comprises an access point selection module configured to select one (or more) access point in the list of access points received from the ANDSF access point discovery server when this list of access points has been generated as a function of a credits usage profile retrieved by this ANDSF server from the credits management OCS server. This selection module can take the form of a computer program executed by the processor of the mobile terminal UE.

Also, the invention relates to a computer program product comprising code instructions for execution of the method described above, when the latter is executed by a processor.

The invention claimed is:

1. A method for management of mobility of a mobile terminal in a communications network, said network comprising:
a plurality of access points associated with different types of wireless access networks; and
an access point discovery server, distinct from the plurality of access points, configured to supply the mobile terminal with a list of access points associated with different types of wireless access networks to which the mobile terminal can connect, the access point discovery server being configured to perform the following processes:
retrieving, from a credits management server, a credits usage profile linked to the mobile terminal; and
generating the list of access points as a function of the credits usage profile, wherein the credit usage profile determines, for each of the different wireless access networks, the credits to utilize said wireless access networks.

2. The management method according to claim 1, wherein retrieval of the credits usage profile comprises sending a request to the credits management server and receipt of at least one message comprising the credits usage profile, sent by the credits management server following receipt of said request.

3. The management method according to claim 2, wherein the request is a request for subscription to updating of credits and the message comprising the credits usage profile is sent by the credits management server following modification of the credits usage profile linked to the mobile terminal.

4. The management method according to claim 3, wherein modification of the credits usage profile comprises depletion of at least one credit allocated to the user of the mobile terminal in the credits usage profile or recharging of at least one depleted credit allocated to the user of the mobile terminal in the credits usage profile.

5. The management method according to claim 1, further comprising sending the list of access points to the mobile terminal, said mobile terminal selecting a fresh access point to which to attach in a mobility situation by way of said list.

6. The management method according to claim 1, wherein the mobile terminal is attached initially to a 3GPP access network and where the list comprises access points belonging to a non-3GPP network.

7. An access points discovery server configured to transmit to a mobile terminal, in a communications network comprising a plurality of access points associated with different types of wireless access networks and an access point discovery server, distinct from the plurality of access points, a list of access points of the wireless access networks to which the mobile terminal can connect, the access point discovery server being configured to:
retrieve, from a credits management server, a credits usage profile linked to the mobile terminal; and
generate the list of access points as a function of said credits usage profile;
wherein the credit usage profile determines, for each of the different wireless access networks, the credits to utilize said wireless access networks.

8. A credits management server comprising a database in which is stored the credits usage profile of the user of a mobile terminal, the credits management server being configured to send to an access point discovery server according to claim 7, said credits usage profile following receipt of a request sent by said access point discovery server.

9. The credits management server according to claim 8, wherein the request sent by the access point discovery server is a request for subscription to updating of credits and wherein the server is configured to send the credits usage profile to the access point discovery server following updating of the credits usage profile.

10. A mobile terminal configured to select an access point of a communications network from a list of access points received from an access point discovery server, according to claim 7, of said communications network, said list of access points being generated as a function of a credits usage profile retrieved by said access point discovery server from a credits management server.

11. A management system for mobility of a mobile terminal comprising:
an access point discovery server according to claim 7; and
a credits management server comprising a database in which is stored the credits usage profile of the user of a mobile terminal, the credits management server being configured to send to said access point discovery server said credits usage profile following receipt of a request sent by said access point discovery server.

12. A non-transitory computer-readable medium having stored thereon instructions for executing a method for management of mobility of a mobile terminal in a communications network, said network comprising a plurality of access points associated with different types of access networks and an access point discovery server, distinct from the plurality of access points, configured to supply the mobile terminal with a list of access points of the wireless access networks to which the mobile terminal can connect, wherein said instructions, when executed by a processor, cause the access point discovery server to:
retrieve, from a credits management server, a credits usage profile linked to the mobile terminal; and
generate the list of access points as a function of the credits usage profile, wherein the credit usage profile determines, for each of the different access networks, the credits to utilize said access networks.

* * * * *